June 15, 1943.    H. J. SAUER    2,321,861
AUTOMOTIVE ACCESSORY
Filed March 20, 1940
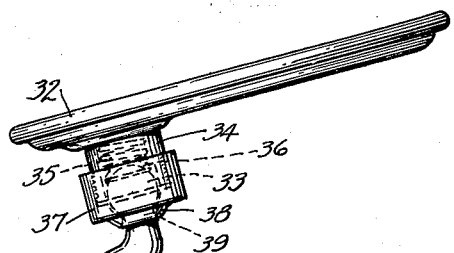
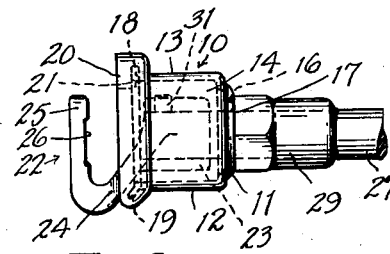
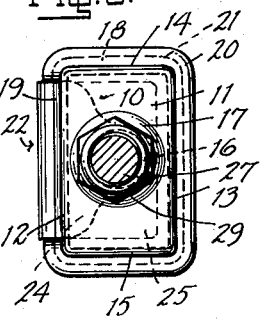
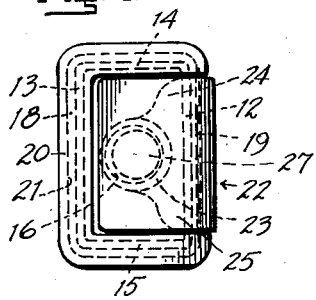
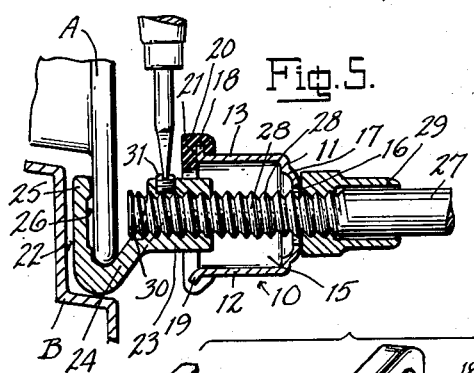
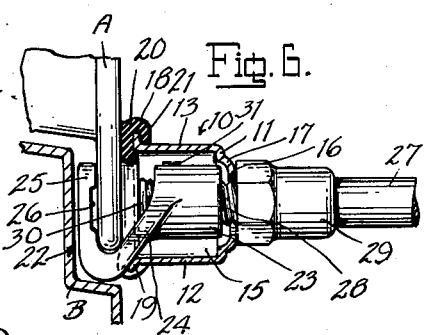
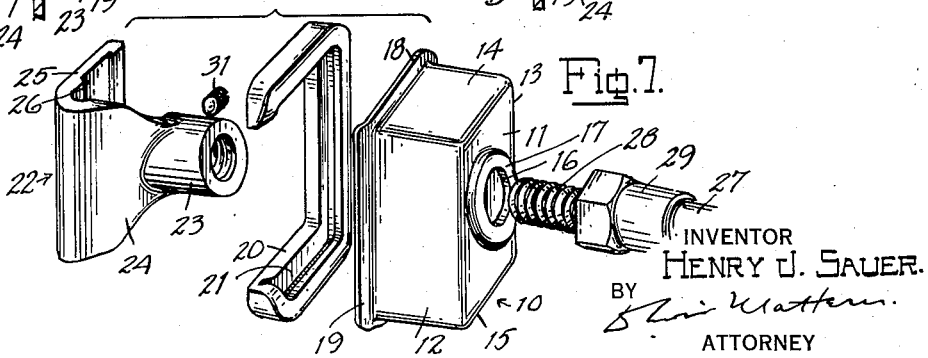
INVENTOR
HENRY J. SAUER.
BY
ATTORNEY Patented June 15, 1943

2,321,861

UNITED STATES PATENT OFFICE 2,321,861

AUTOMOTIVE ACCESSOR

Henry J. Sauer, Fairfield, Conn., assignor to The Kilborn-Sauer Company, Fairfield, Conn., a corporation of Connecticut Application March 20, 1940, Serial No. 324,937

7 Claims. (Cl. 248—226)

The present invention relates to a rear vision mirror bracket, particularly of the type adapted for securing to the forward flanged edge of an automobile door, and is a continuation in part of my co-pending application for Rear vision mirror bracket, Serial No. 299,397, filed October 14, 1939.

It is an object of the invention to provide a bracket which may be secured to the door flange without the necessity for drilling into the door, and which will in no way distort or mar the surface of the door. Another object is to provide a bracket which may be secured rigidly to the door, and by means of which the mirror or accessory supporting bracket arm may be adjusted to any desired angular position and will be rigidly secured in such position.

Due to the weight of the mirror or other automotive fixture devices carried at the outer end of the bracket arm, and the constant vibration to which the bracket arm and its clamping means is subjected during the movement of the automobile, the clamping means heretofore employed for securing the bracket arm to the door have been objectionable, because they have not provided sufficient support at the inner end of the arm to effectually withstand vibration, with the result that the securing means tends to loosen and excessive vibration of the arm is apt to cause breakage. This is especially true where any appreciable weight is provided at the end of the arm, as for instance, when the rear vision mirror is relatively large or is incorporated in a spot-light lamp.

It is therefore an object of the present invention to provide clamping means which will rigidly support the fixture arm at its inner end along a relatively great length thereof, and to this end it is proposed to provide one of the clamping means in the form of a hook having a clamping plate portion for engaging the inner surface of the door flange and having a hub means disposed at the outer side of the door flange and connected to the clamping plate portion by a diagonally disposed arm inclined outwardly away from the door surface, the inner end of the mirror supporting bracket arm being engaged in the hub and being rigidly supported thereby along a substantial length thereof and at a point substantially outwardly spaced from the door surface.

A further object is to provide a clamping cover member for cooperating with the clamping hook member, which completely encloses the hub portion of the hook member at all sides, such clamping cover member adapted to closely contact the outer surface of the door to provide a seal and also to closely contact the diagonally extending hub supporting arm of the hook member to provide a sealed relation therewith.

It is further proposed to provide such clamping means which will maintain this sealed relation irrespective of variations in the relative clamping positions of the clamping hook member and the clamping cover member, as in the case of door flanges of different thicknesses.

It is particularly proposed to provide a cover member having closure walls at its four sides and having a pocket opening at its inner side facing the door flange surface, in which the diagonally disposed arm and hub of the clamping hook member is disposed, and as distinguished from previous types of brackets in which one of the clamping members consisted of a U-shaped strap member having one of the parallel arms extended through a forward open side of the cover member, and which arrangement produced an open space in the forward side of the bracket which allowed dirt and moisture to enter the interior with deleterious effect, and prevented uniform rigid support of the cover member at all of its four sides.

Another object is to provide a bracket which when secured to the car door is theft proof, and to this end it is proposed to provide means for permanently retaining the parts of the bracket and the mirror supporting arm together, and in combination with such means a bracket structure which when secured to the door flange cannot be removed when the door is in closed position. Consequently when the car door is locked the bracket and mirror supporting arm cannot be removed by an unauthorized person, even if such person succeeds in loosening the securing means.

With the above and other objects in view, an embodiment of the invention is shown in the accompanying drawing, and this embodiment will be hereinafter more fully described with reference thereto, and the invention will be finally pointed out in the claims.

In the drawing:

Fig. 1 is a plan view of a rear-vision mirror bracket and mirror, according to the exemplary illustrated embodiment of the invention.

Fig. 2 is a front elevation, the mirror supporting bracket arm being broken away.

Fig. 3 is a side elevation from the outer side, the mirror supporting bracket arm being shown in section, taken along the line 3—3 of Fig. 2.

Fig. 4 is a side elevation from the inner side.

Fig. 5 is a horizontal sectional view, showing the bracket engaged with the door, and with the clamping cover member backed off to expose the set screw for fixing the angularly adjusted position of the bracket arm.

Fig. 6 is a horizontal sectional view, showing the bracket in its operative clamped position secured to the door structure.

Fig. 7 is a perspective view, showing the several parts of the bracket in separated relation.

Fig. 8 is a plan view on a reduced scale, showing a combination spot-light lamp and rear-vision mirror unit supported upon the bracket arm.

Similar reference characters correspond to corresponding parts throughout the several figures of the drawing.

Referring to the drawing, the rear vision mirror bracket, according to the exemplary illustrated embodiment of the invention shown therein, comprises an outer clamping cover or housing member 10, in the form of a rectangular box preferably pressed from sheet metal and consisting of an outer side wall 11, a front wall 12, a rear wall 13, and top and bottom walls 14 and 15, the inner side of the box which faces the surface of the door being open. The side wall 11 is provided centrally with an aperture 16, and in surrounding relation to the aperture the wall is provided with an annular outward embossing 17, forming a projecting nut bearing platform at the outer side, for engagement by the securing nut, and forming a clearance space at the inner side for the hub portion of the clamping hook member, as will presently more fully appear.

The inner edge of the cover member 10 is provided along the rear, top, and bottom walls thereof with an outwardly projecting right angular rim flange 18, and along the front wall 12 with a diagonally projecting lip flange 19, this lip flange 19 adapted in the operative position of the bracket to engage the clamping hook member in sealed relation, as will hereinafter more fully appear, and the rim flange 18 adapted to interlockingly engage in a rubber sealing strip 20 extending along the rear, top, and bottom walls, with an angular groove 21 in which the rim flange is engaged. The outer surface of this sealing strip extends into close contacting relation with the walls of the cover member 10, while the inner surface which engages the automobile door surface extends inwardly beyond the inner wall surface of the cover member, so as to provide a substantially wide supporting surface for the rim flange 18, which in the operative clamped relation imbeds into the compressed sealing strip, as shown clearly in Fig. 6, this compressed interlocking relation being such as to prevent any possibility of the sealing strip slipping out of position due to vibration or other causes.

The clamping yoke or hook member 22 may be in the form of a casting, of brass or bronze, and consists of a cylindrical interiorly threaded hub portion 23, a diagonally extending supporting arm 24 for the hub portion, which is adapted in the operative relation on the door to extend around the edge of the door flange A with the arm projecting diagonally outwardly from the outer surface of the door while the axis of the hub 23 is at a right angle to the outer surface of the door, and a clamping plate portion 25, adapted to engage the inner surface of the door flange, and disposed in a plane at right angles to the axis of the hub portion 23 in opposed relation to the hub portion 23.

The clamping surface of the plate portion 25 is preferably recessed, as at 26, to provide a vertically ribbed surface for a more positive firmly contacting engagement with the inner door flange surface. The height of the hook member along the clamping plate portion 25 and along the part of the diagonal arm portion 24 adapted to be contacted by the lip flange 19 of the cover member, is slightly less than the interior vertical height of the box member, the upper and lower edges of the diagonal arm portion then converging to the cylindrical surface of the hub portion 23. The inclinations of the arm 24 and the lip flange 19 correspond, so that their cooperative contacting surfaces are parallel.

The mirror supporting bracket arm 27 is provided at its inner end with a screw threaded portion 28, upon which is engaged a sleeved nut 29 adapted to bear upon the projected annular bearing surface 17 of the clamping cover member 10, the inner end of the threaded portion being loosely engaged through the aperture 16 and screwed into the interiorly threaded hub 23 of the clamping hook member. The aperture 16 is substantially larger than the diameter of the arm 27 so as to permit of a limited lateral shifting movement of the cover member as the cover member is clamped in relation to the door flange, this shifting movement permitting the lip flange 19 to tightly engage the surface of the diagonal arm 24 of the clamping hook member within a relatively large range of variation in the clamping position of the clamping cover member, the further the cover member is pressed toward the clamping plate portion 25 of the clamping hook member the further the cover member shifts forwardly with respect to the bracket arm.

After assembly of the bracket arm 27 with the hub 23 the end of the bracket arm is headed over, as at 30, so as to prevent outward removal of the bracket arm from the clamping hook member. A set-screw 31 is provided in the hub portion 23 of the clamping hook member which may be tightened against the bracket arm to fix its position of relative angular adjustment, this set-screw adapted to be exposed when the clamping hook member is engaged with the door flange A by backing off the nut 29 and the clamping cover member 10, as shown in Fig. 5. The bracket arm 27 may now be rotated to bring the mirror supporting end to the desired angularly adjusted position and this position fixed by tightening the set-screw with a screw driver. Thereupon the clamping cover member is brought into engagement with the outer surface of the door, and the nut 29 tightened down by a wrench to press the clamping cover member toward the door surface and the clamping hook member, which in the meantime is anchored rigidly against the inner edge of the door flange. In the clamped relation, as shown in Fig. 6, the sealing strip 20 is tightly compressed, forming a seal around the rear, top and bottom walls of the clamping cover member, and the lip flange 19 closely contacts the diagonal arm 24 of the clamping hook member to provide complete sealing of the four walls of the cover member.

As shown clearly in Figs. 2 to 4 the forward ends of the sealing strip 20 extend over the ends of the lip flange 19 into substantial contact with the upper and lower ends of the clamping hook member, so that the interior of the clamping cover member is completely sealed at all sides. This arrangement, in addition to its sealing function, also provides uniform support for the clamping cover member upon its four sides, so that it may be clamped as tightly as necessary without danger of distortion, and in the clamped position will provide a rigid support for the bracket arm at a point substantially spaced from the inner end of the bracket arm 27, and which in cooperation with the substantial support of said inner end by the relatively long hub portion 23 of the clamping hook member effectually supports the bracket arm against excessive vibration.

Upon the outer end of the bracket arm there is adjustably mounted for universal adjustment movement a rear-vision mirror element 32, the adjustable mounting consisting of a ball end 33 formed upon the end of the arm 27 and engaged in an exteriorly threaded nipple 34 secured to the mirror casing, a spring 35 being disposed within the nipple which presses a concave-convex friction bearing plate 36 against the ball surface. A cap nut 37, provided with a spherical shoulder 38 having an aperture 39, is screwed upon the nipple 34 to retain the ball in assembled relation with the nipple, the spherical shoulder 38 fitting the ball surface and the aperture 39 being substantially larger than the neck of the arm 27 adjacent the ball, so that the connection may have universal swiveling movement about the ball to adjust the position of the mirror. The compressed spring exerts sufficient pressure to retain the position of the mirror frictionally, the nut 37 being loosened to reduce this friction during adjustment.

In Fig. 8 I have shown a combination spotlight lamp 40 and rear vision mirror 41 set into the back of the lamp casing, this combination unit being mounted for universal swivelling movement upon the bracket arm 27 in a similar manner to the mounting of the mirror 32.

In operation the bracket is secured to the forward edge flange A of the door by backing the nut 29 outwardly upon the bracket arm 27 to expose the set screw 31. The clamping hook member is thereupon engaged upon the door flange and the bracket arm 27 adjusted to the desired position, whereupon the set screw 31 is tightened to fix this position. Thereupon the clamping cover member is engaged with the door surface and clamped by tightening the nut 29. In the closed position of the door the flange A engages within an angular recess B of the door frame, there being sufficient clearance between the flange and the recess to receive the clamping hook member. In some types of doors the door flange is provided with a rubber sealing strip which resiliently engages the recess B and in this case the clamping plate portion 25 of the clamping hook member will preferably be inserted between the strip and the door flange. In the closed position of the door the end wall of the recess B is opposed to the edge of the door flange A, so that it is impossible to remove the clamping member from the door even if it is loosened by unscrewing the nut 29. As the bracket 27, the clamping cover member 10 and the nut 29 are permanently connected to the clamping hook member by means of the upset head 30 of the bracket arm it will be impossible for unauthorized persons to remove the mirror supporting arm. The assembly is therefore effectually theft proof as long as the automobile door is locked in closed position.

I have illustrated and described preferred and satisfactory embodiments of the invention, but it will be understood that changes may be made therein, within the spirit and scope thereof, as defined in the appended claims.

Having thus described my invention, what I claim and desire to secure by Letters Patent is:

1. A mounting bracket adapted to be installed on an automobile door edge flange, comprising a clamping cover having a top wall and a straight front wall, also having three side walls the bottom of which is adapted to clamp against the outer surface of the door flange, an arm extending outwardly from the clamping cover adapted to support an automobile accessory, a member adapted to be mounted astride the door flange and abut the linear edge of said door, one portion of the member being enclosed within the clamping cover and another portion forming a clamping plate outside said cover and adapted to seat directly against the inner surface of the door flange, that portion of the member abutting the linear edge of the door also being of linear form and operatively engaging the inside of the straight front wall of the clamping cover to close the same at its bottom edge, and screw means cooperatively arranged on the mounting bracket for drawing the clamping plate and the clamping cover toward each other to grip the door flange between them.

2. A mounting bracket adapted to be installed on an automobile door edge flange, comprising a clamping cover having a top wall and side walls with a straight front wall, the bottom of the clamping cover adapted to clamp against the outer surface of the door flange, an accessory-supporting arm extending outwardly through the top wall of the clamping cover, means cooperating with the clamping cover holding the arm therein, a hook means adapted to reach over the door flange and abut its linear edge, one portion of the hook means being enclosed within the clamping cover with another portion thereof constituting a clamping plate disposed beyond the bottom of the clamping cover and adapted to seat directly against the inner surface of the door flange, that portion of the hook means which abuts the linear edge of the door having a straight formation operatively engaging the inside of the straight front wall of the clamping cover to close said cover and being substantially equal in length to said front wall, and screw means cooperatively arranged on the mounting bracket for drawing the clamping plate and the clamping cover toward each other to grip the door flange between them.

3. A mounting bracket comprising, in combination, a clamping cover having a straight front wall, with two end walls and a rear wall, and being adapted to clamp directly against the outer surface of a door flange, to make an engaged fit thereagainst and closing the engaging edges of the last-named walls, an arm extending outwardly from the clamping cover and supporting an automobile accessory, a clamping hook member in the form of a yoke adapted to be mounted astride the door flange and abutting the edge thereof, a portion of the yoke being enclosed with the clamping cover and another portion thereof forming a clamping plate outside said clamping cover to grip the inner surface of the door flange, that portion of the yoke which abuts the edge of the door flange being operatively mounted in engagement with the inside of the straight front wall of the clamping cover to also close the same along its edge, whereby the interior of the clamping cover is closed along all of its edges; and screw means carried by the mounting bracket, in cooperative relation with the housing and with the yoke, for drawing the clamping plate and the clamping cover toward each other to grip the door flange between them.

4. In a bracket for a rear vision mirror or the like, an arm, a clamping hook member secured upon the inner end of said arm and adapted to engage about the edge flange of an automobile door or the like, and including a clamping plate portion adapted to engage the inner surface of said flange, a connecting portion adapted to extend around said flange to its outer side, and a hub portion for receiving said bracket arm, a cup-shaped clamping and cover member having an aperture loosely engaged by said bracket arm and having an opening through its bottom to receive within it said connecting portion and hub portion of said clamping hook member, the cup walls adapted to clamp against the outer surface of the automobile door and to close against the outer surface of said connecting portion of said clamping hook member whereby the interior of said cover member is sealed along its bottom edges, and adjustable securing means carried by said bracket arm adapted upon adjustment to draw said clamping hook member and cover member toward each other to clamp said door flange between them.

5. In a bracket for a rear vision mirror or the like, an arm, a clamping hook member secured upon the inner end of said arm and adapted to engage about the edge flange of an automobile door or the like, and including a clamping plate portion adapted to engage the inner surface of said flange, a diagonal connecting portion adapted to extend around said flange to its outer side, and extending diagonally outwardly and rearwardly from the outer side of the door, and a hub portion for receiving said bracket arm disposed in opposed relation to the outer side of the door flange and having its axis substantially at right angles thereto, a cup-shaped clamping and cover member having an aperture loosely engaged by said bracket arm to permit limited transverse relative shifting movement and having an opening through its bottom to receive within it said connecting portion and hub portion of said clamping hook member, the cup walls adapted to clamp against the outer surface of the automobile door and to close against the outer surface of said diagonal connecting portion of said clamping hook member whereby the interior of said cover member is sealed along its edges, a resilient sealing member engaged with the cup walls along their door clamping edges, and adjustable securing means carried by said bracket arm adapted upon adjustment to draw said clamping hook member and cover member toward each other to clamp said door flange between them.

6. In a mounting bracket for a rear vision mirror or the like, an arm, a clamping hook disposed at the inner end of said arm and adapted to engage about the edge flange of an automobile door or the like, and including a clamping plate portion to engage the inner surface of said flange, with an integral connecting portion to extend around the edge of said flange to its outer side, and a hub portion integral with the connecting portion, a clamping cover mounted for relative movement on said arm and having an opening through its bottom to receive within it said connecting portion and hub portion, bottom edges on the clamping cover adapted to clamp against the outer surface of the door flange and also to close against the outer surface of said integral connecting portion of said clamping hook, whereby the interior of said clamping cover is sealed along its bottom edges, and adjustable screw means cooperatively arranged on the mounting bracket for drawing the clamping plate portion and the clamping cover toward each other to grip the door flange between them.

7. In a bracket for a rear vision mirror or the like, a bracket arm, a clamping hook member rotatably screwed upon the inner end of said arm and adapted to engage about the edge flange of an automobile door or the like, abutment means arranged to limit the rotation of said arm at a predetermined point to prevent outward removal of said bracket arm, a set screw carried by said clamping hook member engaging said bracket arm adapted to secure said arm against relative rotation, a clamping cover member having an aperture loosely engaged by said bracket arm, said cover member being open at its inner side to receive within it the bracket arm securing portion of said clamping hook member, said cover member adapted to close against the outer surface of the automobile door, and a nut carried by said bracket arm adapted to be screwed inwardly to bear upon said cover member to press it into clamping relation to said door flange and to be screwed outwardly to allow outward movement of said cover member to expose and permit loosening of said set screw of said clamping hook member whereby said bracket arm may be rotatably adjusted relatively to said clamping hook member.

HENRY J. SAUER.